US012715603B2

(12) United States Patent
Madoux et al.

(10) Patent No.: US 12,715,603 B2
(45) Date of Patent: Aug. 25, 2026

(54) VEHICLE FUEL STORAGE SYSTEM INCLUDING A BLADDER

(71) Applicant: Plastic Omnium Advanced Innovation and Research, Brussels (BE)

(72) Inventors: Dominique Madoux, Brussels (BE); Pierre Oszwald, Brussels (BE); Changwook Shin, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/880,140

(22) PCT Filed: Jul. 6, 2023

(86) PCT No.: PCT/EP2023/068689
§ 371 (c)(1), (2) Date: Dec. 30, 2024

(87) PCT Pub. No.: WO2024/008858
PCT Pub. Date: Jan. 11, 2024

(65) Prior Publication Data
US 2025/0256565 A1 Aug. 14, 2025

(30) Foreign Application Priority Data
Jul. 7, 2022 (BE) .................................. 2022/5554

(51) Int. Cl.
*B64D 37/10* (2006.01)
*B29C 49/04* (2006.01)
(Continued)

(52) U.S. Cl.
CPC .............. *B64D 37/10* (2013.01); *B29C 49/04* (2013.01); *B29C 49/20* (2013.01);
(Continued)

(58) Field of Classification Search
CPC .......... B60K 15/03; B60K 2015/03085; F02M 37/0082; B64D 37/10; B29C 49/20;
(Continued)

(56) References Cited

U.S. PATENT DOCUMENTS 4,524,609 A 6/1985 Sharp
4,925,057 A * 5/1990 Childress ............ B60K 15/077 169/45
(Continued)

FOREIGN PATENT DOCUMENTS

DE 102018203006 A1 * 8/2019 ....... B60K 15/03504
EP 1 028 017 A2 8/2000
(Continued)

OTHER PUBLICATIONS

Japanese Office Action issued Jun. 3, 2025 in Japanese Patent Application No. 2025-500149 (with English translation), 10 pages.
(Continued)

*Primary Examiner* — Atif H Chaudry
(74) *Attorney, Agent, or Firm* — Oblon, McClelland, Maier & Neustadt, L.L.P.

(57) ABSTRACT

A vehicle fuel storage system may include: a fuel tank, a support member extending inside the tank, and several inflatable bladders extending inside the tank. Each of the inflatable bladders being carried by the support member and attached to the support member. Such bladders may include polyethylene and/or polyamide, or the bladders may be multilayered, including polyethylene and ethylene vinyl alcohol. Each bladder may have a maximum volume in a range of from 5 to 15 liters.

20 Claims, 3 Drawing Sheets

(51) Int. Cl.
*B29C 49/20* (2006.01)
*B29L 31/00* (2006.01)
*B60K 15/03* (2006.01)

(52) U.S. Cl.
CPC .................. *B60K 15/03177* (2013.01); *B29C 2049/2008* (2013.01); *B29C 2049/2073* (2013.01); *B29L 2031/7172* (2013.01); *B60K 2015/03032* (2013.01); *B60K 2015/03085* (2013.01); *B60K 2015/03092* (2013.01)

(58) Field of Classification Search
CPC .... B29C 2049/2008; B29C 2049/2073; B29C 49/04; B29C 2049/201; B29C 2049/2078; B29L 2031/7172; B60Y 2410/122
See application file for complete search history.

(56) References Cited

U.S. PATENT DOCUMENTS

| | | | | |
|---|---|---|---|---|
| 5,722,374 | A | 3/1998 | Kidokoro et al. | |
| 9,623,980 | B2 * | 4/2017 | Meillat | B64D 37/24 |
| 2004/0231829 | A1 * | 11/2004 | Amano | F28D 20/02<br>165/104.12 |
| 2009/0139994 | A1 | 6/2009 | Aoki et al. | |
| 2016/0368374 | A1 | 12/2016 | Aso | |
| 2020/0406745 | A1 * | 12/2020 | Arras | B60K 15/03177 |

FOREIGN PATENT DOCUMENTS

| | | | |
|---|---|---|---|
| FR | 2 679 841 | A1 | 2/1993 |
| FR | 2 972 685 | A1 | 9/2012 |
| JP | 2002-506780 | A | 3/2002 |
| JP | 6311656 | B2 | 4/2018 |
| KR | 10-2004-0054880 | A | 6/2004 |
| KR | 10-0500273 | B1 | 7/2005 |
| KR | 10-0535076 | B1 | 12/2005 |
| WO | WO-01/54938 | A1 | 8/2001 |
| WO | WO 2021/013940 | A1 | 1/2021 |

OTHER PUBLICATIONS

Korean Office Action issued Jan. 26, 2025 in Korean Patent Application No. 10-2025-7001580 (with English translation), 11 pages.
International Search Report issued Nov. 29, 2023 in PCT Application No. PCT/EP2023/068689 filed Jul. 6, 2023, 3 pages.

* cited by examiner 6
14
18
28

24
22
30
24
22
30
26
32
26
30
8

36
8

38
36
6

VEHICLE FUEL STORAGE SYSTEM INCLUDING A BLADDER

CROSS-REFERENCE TO RELATED APPLICATIONS

The present application is the national stage of international application PCT/EP2023/068689, filed on Jul. 6, 2023, and claims the benefit of the filing date of Belgian Appl. No. 20225554, filed on Jul. 7, 2022.

The invention relates to vehicle fuel tanks. More particularly, the invention relates to a vehicle fuel storage system and a method of manufacturing such a vehicle fuel storage system.

The fuel stored in a vehicle fuel tank is subject to temperature fluctuations that depend mainly on the outside temperature. Depending on the climate to which the vehicle is exposed, fuel temperature can vary greatly, especially if the vehicle is outdoors when driving or parked. When the temperature of the fuel stored in the tank rises, some of it evaporates. As the tank defines a closed volume, the generation of fuel vapor leads to a rise in pressure in the gaseous phase inside the tank. High fuel vapor pressure generates mechanical stresses on the tank walls, which can damage them or at the very least constitute a risk of tank explosion if the pressure rise is not controlled. US 2009/139994 A1 discloses a manufacturing method for obtaining a fuel tank in which this pressure rise problem can occur.

It is known in the prior art, for example from document WO 2021/013940 A1 or document KR 2004 0054880 A, to place an inflatable bladder inside the fuel tank. This bladder is connected to an air inlet and outlet pipe leading from the fuel tank, enabling air to be alternately supplied to the bladder or discharged from it. This way, depending on the fluctuation in the amount of fuel vapor in the tank, the bladder can inflate or deflate to modify the volume available for fuel vapor and thus limit variations in fuel vapor pressure.

Although this bladder system configuration reduces the risk of pressure peaks in the fuel tank, it does pose certain problems. Indeed, the relatively large volume of the bladder may be incompatible with the generally complex shape of the fuel tank or, conversely, may necessitate modifying the shape of the fuel tank so that it has an area of shape and dimensions to accommodate the bladder. For example, for a 45 liter fuel tank, the bladder needs to have a volume of around 20 liters to have a significant beneficial effect, which necessitates a large enough and clear area inside the tank to receive the bladder. In addition, the large volume of the bladder makes it complex to insert into the tank and to attach while the tank is being manufactured, which in turn increases the cost and time required to manufacture the tank.

In particular, the invention aims to solve the problems identified in the prior art by limiting the pressure build-up of fuel vapor in the tank and avoiding or mitigating the disadvantages posed by the prior art bladder and its large volume.

To this end, the invention relates to a fuel storage system for a motor vehicle comprising:

- a fuel tank,
- a support member extending inside the tank, and
- several inflatable bladders extending inside the tank, each of the inflatable bladders being carried by the support member and attached to the support member.

Thus, the single-bladder fuel storage system of the prior art here is replaced by a fuel storage system comprising several bladders carried by a support member. It is understood that, for the same total volume of bladders, the system according to the invention comprises bladders of smaller volume which are easier to arrange in the internal volume of the tank, without the need for the tank to have an area specially designed to receive the bladders.

Furthermore, the fact that the bladders are carried by a support member greatly facilitates the manufacture of the fuel storage system. In fact, it is possible to prepare the support member and attach the bladders thereto before inserting them into a parison to be molded to form the tank. In this way, the manufacture of the fuel storage system is less complex to implement, insofar as some of its stages are simplified and require fewer constraints to be carried out.

Furthermore, in an embodiment in which the bladders are not connected to one another, the fact of having several bladders enables the fuel storage system to continue operating in the event of a malfunction of one of the bladders, unlike the prior art system. This improves the reliability of the fuel storage system.

Advantageously, the bladders are made of polyethylene (PE), polyamide (PA), or in the form of a multilayer comprising polyethylene (PE), preferentially high-density polyethylene (HDPE), and ethylene vinyl alcohol (EVOH).

Preferentially, the polyethylene is high-density polyethylene (HDPE), and the polyamide is polyamide 6, 11 or 12 (PA6, PA11 or PA12).

Advantageously, the multilayer comprises an adhesive layer between the polyethylene (PE) layer, preferentially high-density polyethylene (HDPE), and the ethylene vinyl alcohol (EVOH) layer.

In this way, different materials can be chosen for the bladders to give them a choice of characteristics, such as low cost, mechanical strength or fuel impermeability.

Advantageously, each bladder has a maximum volume of between 5 and 15 liters.

Advantageously, each bladder has a different maximum volume.

Advantageously, each bladder has a different shape.

Advantageously, the sum of the maximum volume of each bladder is between 25 and 35 liters, preferentially 30 liters.

This makes it easy to size the bladders according to the specifications to be met by the fuel storage system and tank. In other words, the shape and volume of the bladders can be easily adapted to achieve a predetermined total bladder volume while taking into account the architecture of the fuel tank, showing the versatility of the invention.

Advantageously, the bladders are configured to deform in two opposite directions when inflated or deflated. According to an embodiment of the invention, the bladders are configured to deform along an axis Z that is vertical when the storage system equips a vehicle on horizontal ground.

This provides greater freedom in positioning the bladders in the tank. If the bladders were configured to deform in only one direction, it would be necessary to provide a large amount of travel in this direction for the bladders. This is not the case with the configuration in which deformation can take place in two opposite directions.

Advantageously, at least one of the bladders is equipped with coupling means configured to receive an accessory.

This allows the bladders to perform an additional function in the fuel storage system, obviating the need for a component specifically designed for this function. This reduces tank space requirements and simplifies the design of the fuel storage system.

Advantageously, each bladder is equipped with a valve configured to alternately allow or prevent inflation and deflation.

In this way, bladders can be adapted to suit the pressure inside the tank.

Advantageously, the fuel storage system comprises an air circuit comprising:

a node, feed sections connecting the node to the internal volume of each bladder, and an output section connecting the node to a tank outlet.

In this way, the bladders operate with a single air circuit, simplifying their use. This also simplifies their arrangement in the tank, since only a single opening in the tank is needed to allow air to enter and exit the bladders.

Preferably, the tank outlet leads to a filter, such as an activated carbon filter or canister, located outside the tank.

Thus, even if fuel vapor enters the bladders and mixes with the air inside, the fuel vapor is not released into the atmosphere, but is captured by the filter.

Advantageously, the support member comprises a bladder attachment means, preferably the bladder attachment means is selected from the following list: clipping, slide-type attachment, welding.

This ensures that the bladders are securely attached to the support member, and the attachment means can be produced by simple, inexpensive means.

Advantageously, the support member is attached to at least one tank wall or to at least one pillar extending inside the tank.

In this way, the manner in which the support member is attached to the inside of the tank can be chosen, giving greater freedom in positioning the support member inside the tank.

Advantageously, the fuel storage system further comprises at least one heat storage member, extending inside the tank, comprising a phase-change material having a melting point between 18° and 40° C., the phase-change material being preferentially selected from the following list: calcium chloride hexahydrate ($CaCl_2 \cdot 6H_2O$), octadecane ($C_{18}H_{38}$), cyclohexanol ($C_6H_{12}O$), a glycerin derivative.

The at least one heat storage member can absorb heat, particularly when the fuel has a temperature close to the melting point of the phase-change material. Since the fusion reaction is endothermic, it consumes heat from the fuel. The at least one heat storage member limits the temperature rise of the fuel and therefore the generation of fuel vapor in the tank. This limitation of fuel vapor generation enables bladders to be sized with a smaller total volume, thereby reducing the disadvantages associated with total bladder volume, in particular the limitation of the useful tank volume. This means that the combined effects of the at least one heat storage member and the bladders outweigh the effects of the at least one heat storage member and the bladders on their own.

Advantageously, the fuel storage system further comprises at least one spacer member attached to the support member and configured to prevent contact between the tank and the support member during manufacture of the fuel storage system.

This prevents the support member from being damaged during tank manufacture. The tank is generally manufactured by molding a parison, which is heated to a sufficiently high temperature to make it malleable. The hot parison could heat up the support member and potentially deform it locally without this being desirable. Such deformation could adversely affect the mechanical strength of the support member, or even hinder bladder operation, which is why it is preferable to protect the support member with the spacer member.

Advantageously, each bladder is equipped with a protective shell surrounding said bladder.

This prevents the bladders from deteriorating during tank manufacture. Indeed, as previously mentioned, the tank is generally manufactured by molding a parison, previously, which is heated to a sufficiently high temperature to make it malleable. The hot parison could heat up the bladders and potentially deform them locally, which is undesirable, especially as bladders are generally millimeter-thick. Such deformation could adversely affect the mechanical strength of the support member, or even hinder bladder operation, which is why it is preferable to protect the bladders with the protective shells. Furthermore, the protective shells protect the bladders from fuel waves that may be generated in the tank during sudden vehicle acceleration or deceleration.

Also provided according to the invention is a method of manufacturing a vehicle fuel storage system, wherein at least the following steps are carried out, preferentially in succession:

providing a parison in an open mold, placing a support member and several inflatable bladders on an insertion rod or robot arm, each inflatable bladder being carried by the support member and attached to the support member, inserting, inside the parison, the support member and bladders carried by the insertion rod or robot arm, pre-blowing the parison and bringing the parison into contact, directly or indirectly, with the support member, removing the insertion rod or robot arm, closing the mold, and blowing the parison to obtain a tank containing the support member and the bladders.

As previously stated, the fact that the bladders are carried by a support member greatly facilitates the manufacture of the fuel storage system. The support member is prepared and the bladders are attached thereto at the start of the method, and then the assembly is inserted into the hot parison to be molded to form the tank. The manufacture of the fuel storage system is less complex to implement, insofar as some of its stages are simplified and require fewer constraints to be carried out. In particular, fewer attachment operations need to be carried out inside the hot parison or inside the molded tank, which corresponds to configurations in which the interior volume of the parison or tank is difficult to access, making handling of the support member and bladders more complicated.

Advantageously, before the insertion step, at least one spacer member is attached to the support member, the spacer member being configured to prevent any direct contact between the parison and the support member during the partial mold closing step.

Advantageously, before the insertion step, each bladder is fitted with a protective shell surrounding said bladder, each protective shell being configured to prevent any direct contact between the parison and the bladders during the insertion step and the partial mold closing step.

BRIEF DESCRIPTION OF THE FIGURES

The invention will be better understood upon reading the following description, which is provided merely as example and with reference to the appended drawings, wherein.

Figure 1:
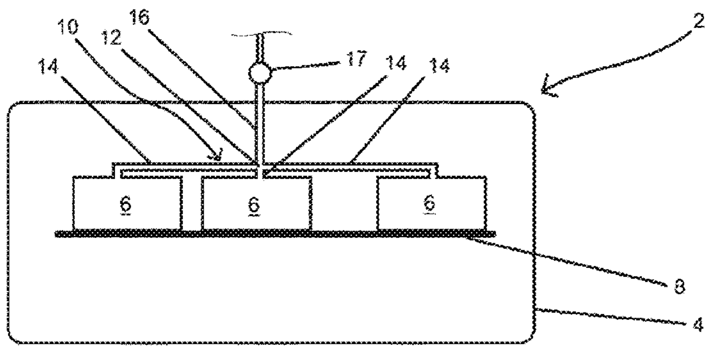
FIG. 1 is a schematic and general view of a fuel storage system according to the invention.
Figure 2:
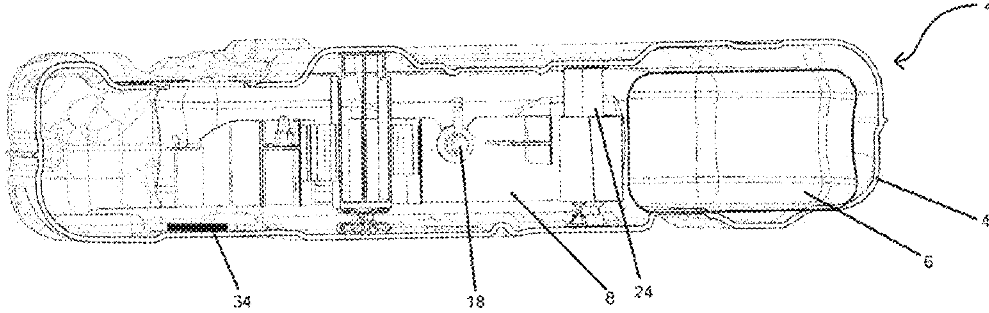
FIG. 2 is a cross sectional view of a fuel storage system according to one embodiment of the invention.

A fuel storage system for a vehicle 2 according to the invention in general is shown in FIG. 1, and a fuel storage system according to an embodiment of the invention is shown in FIG. 2.

The fuel storage system 2 comprises a fuel tank 4, generally made of plastic, configured to store the fuel used by the vehicle, notably for its propulsion. The tank 4 defines an internal volume into which the fuel extends in both liquid and gaseous form, according to a distribution that depends in particular on the pressure and temperature conditions inside the tank 4. The tank generally comprises a filler pipe for filling the tank with fuel, a vent pipe for evacuating fuel vapors under certain conditions, and an injection pipe for delivering fuel to the vehicle engine. These three pipes are well known to the prior art, so they are not shown on the figures and will not be described further in the following.

Figure 3:
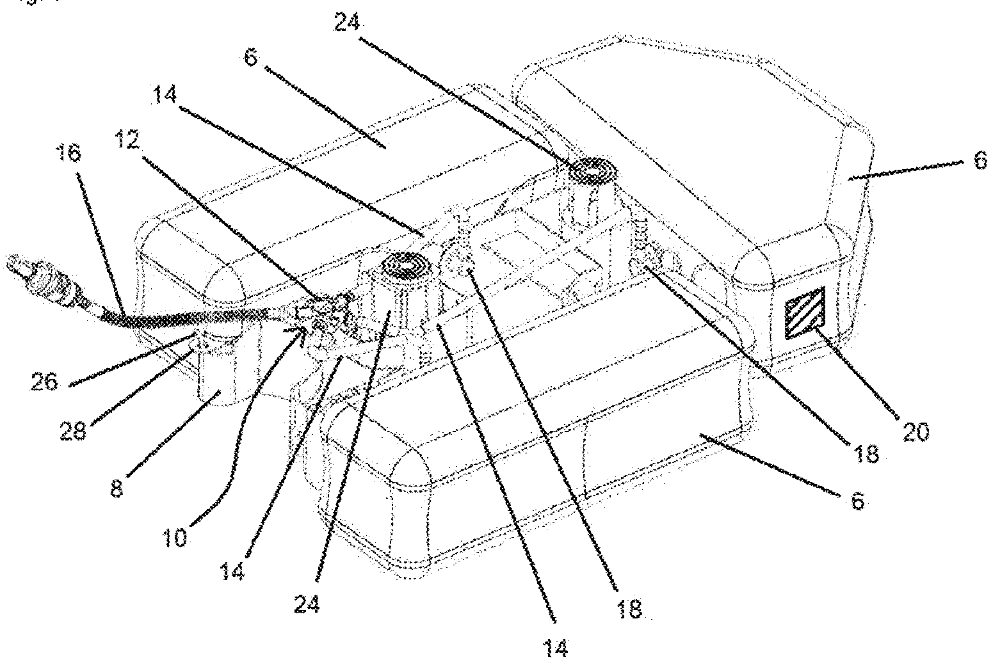
FIG. 3 is a perspective view of a support member carrying three bladders arranged inside the fuel storage system of FIG. 2.

The fuel storage system 2 comprises several inflatable bladders 6 extending inside the tank 4 and carried by a support member 8 extending integrally inside the tank 4. The support member 8 carrying the bladders 6 is shown in more detail in FIG. 3.

Each bladder 6 has a resiliently deformable wall allowing it to be inflated and deflated without plastic deformation. The bladders here are made of polyethylene (PE), polyamide (PA), or in the form of a multilayer comprising polyethylene (PE) and ethylene vinyl alcohol (EVOH). Preferentially, the polyethylene is high-density polyethylene (HDPE), the polyamide is polyamide 6, 11 or 12 (PA6, PA11 or PA12), and the multilayer comprises an adhesive layer between a high-density polyethylene layer and the ethylene vinyl alcohol layer.

To allow the inflation and deflation of the bladders 6, the fuel storage system 2 comprises an air circuit 10 connected on the one hand to the bladders 6 and on the other hand to an air supply system (not shown) located outside the tank 4. Owing to the air circuit 10, it is possible, alternately, to fill the bladders 6 with air so that they occupy a larger total volume in the tank 4 and to evacuate part of the air contained in the bladders 6 so that they occupy a smaller total volume in the tank 4. The bladders are configured to deform, when inflated or deflated, in two opposite directions, namely upwards and downwards in the configuration of the fuel storage system 2 shown in FIG. 2.

The air circuit 10 comprises a node 12, supply sections 14 connecting the node 12 to the internal volume of each of the bladders 6 and an outlet section 16 connecting the node to an outlet of the tank 4. Preferably, the tank outlet 4 leads to a filter 17, for example a carbon filter or canister, located outside the tank 4, then leaves the fuel storage system 2.

Here, the node 12 simply forms a fluidic connection between the supply sections 14 and the output section 16, but it can also be formed by a four-way valve.

Figures 4, 5:
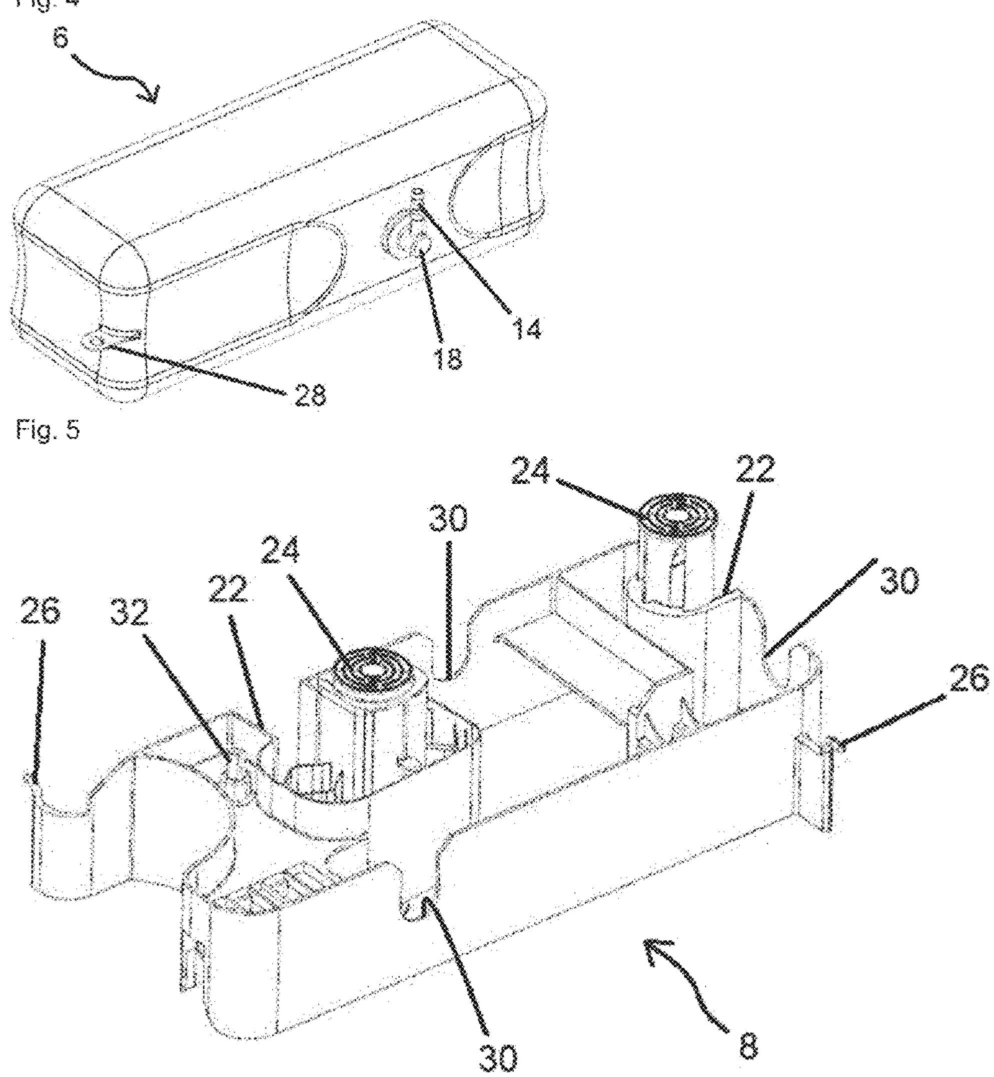
FIG. 4 is a perspective view of one of the bladders of FIG. 3.
FIG. 5 is a perspective view showing the support member of FIG. 3.

As shown in FIG. 4, each bladder 6 is equipped with a valve 18 configured to alternately allow or prevent inflation and deflation. The valve 18 of each bladder is located on its supply section 14. The valves 18 enable each bladder 6 to be activated or deactivated at any time. In other words, when a valve 18 is closed, the air contained in the bladder 6 with which it is associated remains blocked in the bladder 6 until the valve 18 is opened.

Here, there are three bladders 6, but any other number of bladders can be provided, for example two or more than four, depending on the volume and shape of the tank 2. Each bladder 6 has a maximum volume, which may or may not be different, of between 5 and 15 liters, and the sum of the maximum volume of the bladders is between 25 and 35 liters, for example 30 liters. Here again, the maximum volume of each bladder and the sum of the maximum volume of the bladders is chosen according to the volume and shape of the tank, and the ranges of values proposed can be adapted to certain types of motor vehicle tanks.

At least one of the bladders 6 is equipped with coupling means 20 configured to receive an accessory, which may be an active or passive accessory and whatever its function in the fuel storage system 2.

The support member 8 is shown in greater detail in FIG. 5. The support member 8 is generally shaped like a cookie-cutter, with a contour that enables it to adapt to the architecture of the tank 4 and to the elements located inside it. It thus has concave sections 22 allowing the passage of pillars 24 forming internal reinforcement elements of the tank 4, or even attachment to at least one of these pillars 24.

The support member 8 comprises first attachment means 26 configured to engage with second attachment means 28 provided on the bladders 6 to attach the bladders 6 to the support member 8. Here, the first and second attachment means 26, 28 form a sliding connection provided by male parts on the support member 8 and female parts on the bladders 6. Alternatively, the first and second attachment means can be clipped or welded. In the latter case, the first and second attachment means are formed by surfaces suitable for welding the bladders to the support member.

The support member 8 comprises notches 30 configured to receive one end of the feed sections 14 and part of the valves 18 so that these are not deformed by the support member 8, which could hinder their operation.

The support member 8 comprises a base 32 arranged to fixedly receive the node 12 of the air circuit 10. This reduces movement of the air circuit 10 in the fuel tank 4, for example caused by fuel waves, which could damage the air circuit or disconnect the feed sections 14 from the bladders 6.

The fuel storage system 2 optionally comprises at least one heat storage member 34, extending inside the tank 4 and here attached on a bottom wall of the tank 4 on the interior side thereof, configured to exchange heat with the fuel.

The heat storage member 34 comprises a phase-change material housed in an enclosure that is impermeable to this material and to the fuel, so that the enclosure does not allow material exchange between the fuel and the heat storage member 34. Conversely, the enclosure of the heat storage unit 34 is heat-conducting, so that it allows heat exchange between the fuel and the phase-change material. The phase-change material has a melting point between 18° and 40° C. By way of example, the phase-change material is selected from the following list: calcium chloride hexahydrate ($CaCl_2 \cdot 6H_2O$), octadecane ($C_{18}H_{38}$), cyclohexanol ($C_6H_{12}O$), a glycerin derivative. More preferably, the phase-change material has a melting point between 20° and 30° C., i.e. close to the temperature range within which the fuel temperature is found.

Figures 6, 7:
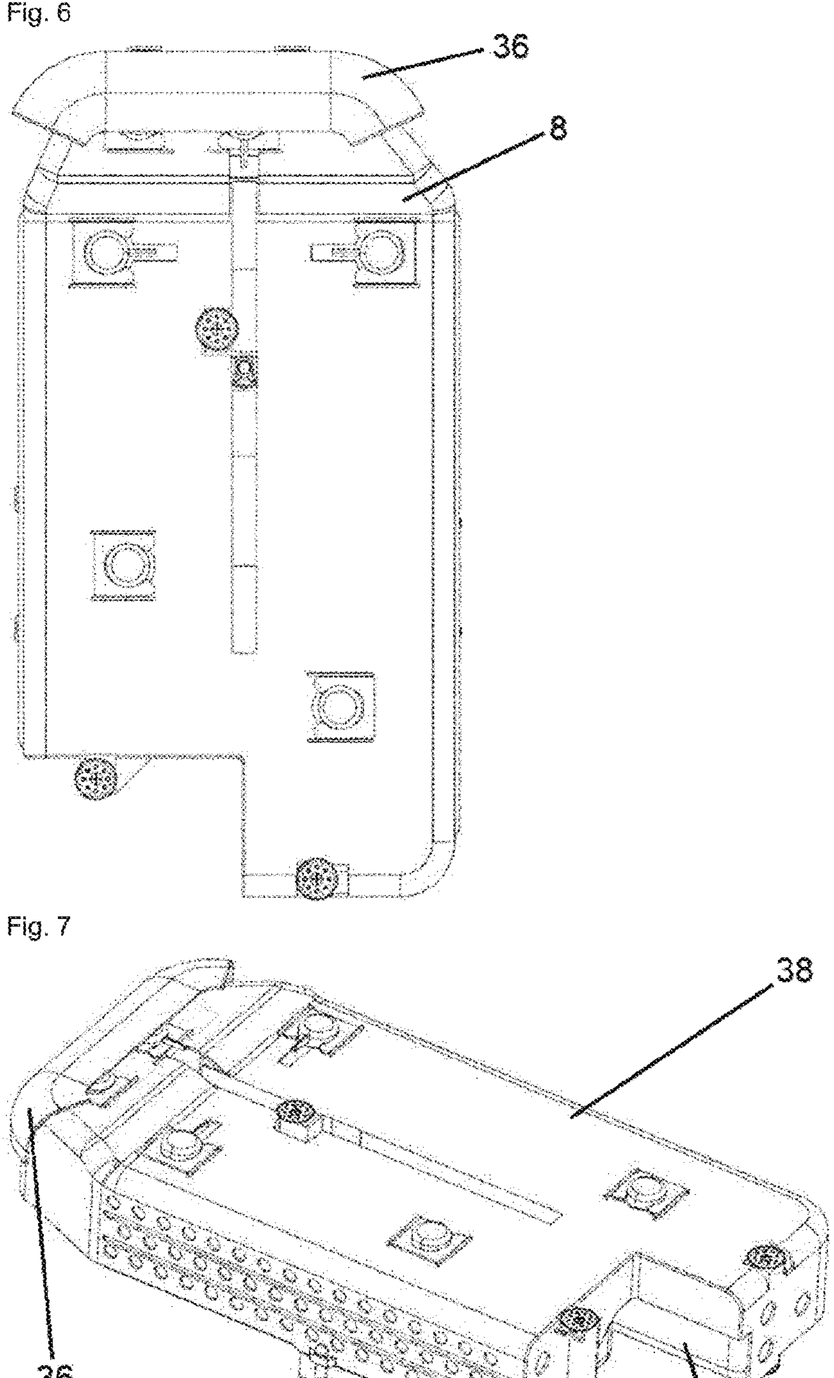
FIG. 6 is a perspective view of a spacer member fitted to the fuel storage system of FIG. 2.
FIG. 7 is a perspective view of a protective shell fitted to the fuel storage system shown in FIG. 2.

With reference to FIG. 6, the fuel storage system 2 comprises at least one spacer member 36 attached to the support member 8 and configured to prevent contact between the tank and the support member during manufacture of the fuel storage system 2. With reference to FIG. 7, each bladder 6 is equipped with a protective shell 38 surrounding said bladder 6. In the embodiment shown in FIG. 7, the fuel storage system 2 comprises a single protective shell 38 common to all the bladders 6. In one embodiment, the fuel storage system comprises as many protective shells as bladders. The functions of the spacer member and the protective shell 38 will be described in greater detail later.

As the fuel temperature rises, for example when the outside temperature exceeds the fuel temperature, some of the fuel evaporates, generating fuel vapor in the tank 4. Since the tank 4 defines a closed volume, increasing the amount of fuel vapor increases the pressure in the gas phase inside the tank. It will now be described how the fuel storage system 2 according to the invention makes it possible to limit this pressure increase.

The bladders 6 are compressed under the action of the pressure in the gaseous phase inside the tank 4. Since the wall of the bladders 6 is deformable, a balance of stresses on these walls is established, this balance leading to the evacuation of some of the air contained in the bladders 6 by means of the air circuit 10 for the bladders whose valve 18 is open. In this way, the volume of these bladders 6 extending into the tank 4 decreases, and the volume occupied by the fuel vapor increases, resulting in a reduction in fuel vapor pressure. When the fuel temperature eventually drops, for example when the outside temperature falls below the fuel temperature, some of the fuel vapor condenses. This reduces the amount of fuel vapor in the tank 4, as well as the fuel vapor pressure. A new equilibrium of stresses on the wall of the bladders 6 is established, leading to a filling of the bladders 6 by means of the air circuit 10 and an increase in the volume of the bladders 6 extending into the tank 4.

If more than one heat storage member 34 is present, the latter has a thermal capacity that enables it to absorb some of the heat from the fuel. When the temperature of the heat storage member 34 reaches the melting point of the phase-change material, that material begins to melt. Since the melting reaction is endothermic, the phase-change material absorbs heat from the fuel to supply this reaction, thus limiting the temperature rise of the fuel. In other words, the increase in fuel vapor pressure in the tank is limited by limiting the increase in fuel temperature.

The bladders can be fitted with a restriction to allow inflation or deflation according to a specific flow rate.

A method for manufacturing the fuel storage system 2 will now be described. The following steps are carried out in succession.

The first step is to provide a molten parison in an open mold. The parison is designed to form the walls of the tank 4. The mold has a shape corresponding to the shape that will be given to the tank 4. The parison is generally made of polyethylene.

The support member 8 carrying the inflatable bladders 6 is placed on an insertion rod or robot arm. Optionally, a mechanism can be provided at this stage on the support member and configured to prevent premature deployment or expansion of the bladders.

Before the next insertion step, the at least one spacer member 36 is attached to the support member 8, and the bladders 6 are fitted with the protective shell 38.

The support member 8 and bladders 6 carried by the insertion rod or robot arm are inserted into the parison. If a mechanism as described in the previous paragraph is present, it is activated at this stage, for example using the insertion rod or robot arm, so as to release the bladders and no longer prevent their deployment or expansion.

The parison is pre-blown and brought into contact, directly or indirectly, with the support member. After pre-blowing, the support member 8 and bladders 6 are held in position by the pre-blown parison on the one hand, and by the insertion rod or robot arm on the other. The support member 8 and the bladders 6 are protected from the parison by the spacer member 36 and the protective shell 36, respectively. To this end, the spacer member 36 and protective shell 38 are made from a material with a higher melting point than that of the parison material, so that the parison slides against the spacer member 36 and protective shell 38 without damaging the support member 8 and bladders 6. The spacer member 36 and protective shell 38 are made of high-density polyethylene (HDPE), polyoxymethylene (POM), polyphthalamide (PPA) or a thermoplastic with a melting point higher than that of the parison material. These materials have a higher melting point than the polyethylene making up the parison.

The insertion rod or robot arm is removed, so that the support member 8 and bladders 6 are held in position only by the parison and mold. At this stage, the support member 8 can be attached to the parison, for example by welding, in which case the support member comprises at least one weld zone enabling the support member to be welded to the parison.

The mold is closed, then the parison is blown to obtain the tank 4 containing the support member 8 and the bladders 6. The tank 4 is thus obtained by a blow-molding method.

LIST OF REFERENCES

2: fuel storage system
4: tank
6: bladder
8: support member
10: air circuit
12: node
14: feed section
16: output section
17: filter
18: valve
20: coupling means
22: concave section
24: pillar
26: first attachment means
28: second attachment means
30: notch
32: base
34: heat storage member
36: spacer member
38: protective shell

The invention claimed is:

1. A fuel storage system configured for a vehicle, the system comprising:

a fuel tank;

a support member extending inside the tank and supported by a floor of the tank or a pillar inside the tank;

a first inflatable bladder extending inside the tank; and a second inflatable bladder extending inside the tank, wherein each of the inflatable bladders is carried by the support member and attached to the support member, the support member being distinct from tank walls of the fuel tank.

2. The system of claim 1, wherein the bladders comprise polyethylene or polyamide, or wherein the bladders are multilayered, comprising polyethylene and ethylene vinyl alcohol.

3. The system of claim 1, wherein each bladder has a maximum volume in a range of from 5 to 15 liters.

4. The system of claim 3, wherein a sum of the maximum volume of each of the bladders is in a range of from 25 to 35 liters.

5. The system of claim 1, wherein the bladders are configured to deform, upon inflation or deflation, in two opposite directions.

6. The system of claim 1, wherein at least one of the bladders comprises a coupling element configured to receive an accessory.

7. The system of claim 1, wherein each bladder comprises a valve configured to alternately allow or prevent inflation and deflation thereof.

8. The system of claim 1, further comprising an air circuit comprising:

a node;

feed sections connecting the node to the internal volume of each bladder; and an output section connecting the node to a tank outlet.

9. The system of claim 8, wherein the tank outlet leads to a filter located outside the tank.

10. The system of claim 1, wherein the support member comprises a bladder attachment element.

11. The system of claim 1, wherein the support member is attached to at least one wall of the tank or to at least one pillar extending inside the tank.

12. The system of claim 1, further comprising:

a heat storage member, extending inside the tank, comprising a phase-change material having a melting point in a range of from 18 to 40° C.

13. The system of claim 1, further comprising:

a spacer member attached to the support member and configured to prevent contact between the tank and the support member during manufacture of the fuel storage system.

14. The system of claim 1, wherein each bladder comprises a protective shell surrounding the bladder.

15. A method of manufacturing a fuel storage system configured for a vehicle, the method comprising:

providing a parison in an open mold;

placing a support member and two or more inflatable bladders on an insertion rod or robot arm, each inflatable bladder being carried by the support member and attached to the support member;

inserting, inside the parison, the support member and bladders carried by the insertion rod or robot arm;

pre-blowing the parison and bringing the parison into contact, directly or indirectly, with the support member;

removing the insertion rod or robot arm;

closing the mold; and blowing the parison to obtain a tank comprising the support member and the bladders.

16. The method of claim 15, further comprising, before the inserting:

attaching at least one spacer member to the support member, wherein the at least one the spacer member is configured to prevent any direct contact between the parison and the support member during the closing.

17. The method of claim 15, wherein, before the inserting:

fitting each bladder with a protective shell surrounding the bladder, wherein each protective shell is configured to prevent any direct contact between the parison and the bladders during the inserting and the closing.

18. The system of claim 1, further comprising:

a third inflatable bladder extending inside the tank.

19. The system of claim 3, wherein a sum of the maximum volume of each of the bladders is 30 liters.

20. A fuel storage system configured for a vehicle, the system comprising:

a fuel tank;

a support member extending inside the tank and supported by a floor of the tank or a pillar inside the tank;

a first inflatable bladder extending inside the tank;

a second inflatable bladder extending inside the tank; and a spacer member attached to the support member and configured to prevent contact between the tank and the support member during manufacture of the fuel storage system, wherein each of the inflatable bladders is carried by the support member and attached to the support member.

* * * * *